(12) United States Patent
Westlake

(10) Patent No.: US 10,666,801 B2
(45) Date of Patent: May 26, 2020

(54) SECURE DATA EXCHANGE BY VOICE IN TELEPHONE CALLS

(71) Applicant: Syntec Holdings Limited, London (GB)

(72) Inventor: Colin Philip Westlake, London (GB)

(73) Assignee: Syntec Holdings Limited, London (GB)

( * ) Notice: Subject to any disclaimer, the term of this patent is extended or adjusted under 35 U.S.C. 154(b) by 0 days.

(21) Appl. No.: 15/879,000

(22) Filed: Jan. 24, 2018

(65) Prior Publication Data

US 2018/0213084 A1    Jul. 26, 2018

Related U.S. Application Data

(60) Provisional application No. 62/450,247, filed on Jan. 25, 2017.

(30) Foreign Application Priority Data

Jan. 25, 2017    (GB) .................................. 1701250.1

(51) Int. Cl.
    *H04M 3/51*    (2006.01)
    *G10L 15/02*   (2006.01)

(52) U.S. Cl.
    CPC .............. *H04M 3/51* (2013.01); *G10L 15/02* (2013.01); *H04M 3/5166* (2013.01);
    (Continued)

(58) Field of Classification Search
    CPC combination set(s) only.
    See application file for complete search history.

(56) References Cited

U.S. PATENT DOCUMENTS

| | | | |
|---|---|---|---|
| 8,750,471 B2 | 6/2014 | Tew et al. | |
| 2005/0125570 A1* | 6/2005 | Olodort | G06F 1/162 710/15 |

(Continued)

FOREIGN PATENT DOCUMENTS

| | | |
|---|---|---|
| GB | 2478916 A | 9/2011 |
| WO | WO 2007/009028 A2 | 1/2007 |

OTHER PUBLICATIONS

Rabiner, L.R., et al., "An Algorithm for Determining the Endpoints of Isolated Utterances," The Bell System Technical Journal Feb. 1975, pp. 297-315, vol. 54, Issue 2.

(Continued)

*Primary Examiner* — Akelaw Teshale
(74) *Attorney, Agent, or Firm* — Fenwick & West LLP

(57) ABSTRACT

The present invention relates to a telephone call processing system and a method of processing telephone calls, and in particular to systems and methods that facilitate secure transmission and accurate identification of sensitive information spoken during a call between a caller and an agent such that the agent does not have access to the sensitive information. The methods of the present invention involve outputting scrambled, out-of-sequence and/or partitioned sub-sets of a spoken voice stream to one or more recognition agents, which identify elements of the sensitive information and return the identified elements to a call processor for un-scrambling, re-ordering and/or re-assembly by the call processor to produce the identified sensitive information.

20 Claims, 4 Drawing Sheets

(52) U.S. Cl.
CPC .... *H04M 2201/40* (2013.01); *H04M 2203/40* (2013.01); *H04M 2203/6027* (2013.01)

(56) References Cited

U.S. PATENT DOCUMENTS

| | | | |
|---|---|---|---|
| 2009/0077038 A1* | 3/2009 | Dolbey, Jr. | G10L 13/00 |
| 2011/0228919 A1* | 9/2011 | Tew | H04M 3/38 |
| | | | 379/93.12 |
| 2012/0027195 A1 | 2/2012 | Shaffer et al. | |
| 2014/0109204 A1* | 4/2014 | Papillon | H04L 9/3215 |
| | | | 726/5 |
| 2017/0220790 A1* | 8/2017 | Fonseca | G06F 3/0482 |
| 2018/0032558 A1* | 2/2018 | Oliner | G06F 16/43 |
| 2018/0068102 A1* | 3/2018 | Aronowitz | G06F 21/32 |

OTHER PUBLICATIONS

Search Report for Great Britain Patent Application No. GB 1701250.1, dated Aug. 24, 2017, 1 Page.

* cited by examiner

SECURE DATA EXCHANGE BY VOICE IN TELEPHONE CALLS

CROSS REFERENCE TO RELATED APPLICATIONS

This application claims the benefit of U.S. Provisional Application No. 62/450,247, filed Jan. 25, 2017, which is incorporated by reference in its entirety.

This application also claims the right of priority based on United Kingdom application Ser. No. 1701250.1, filed Jan. 25, 2017, which is incorporated by reference in its entirety.

TECHNICAL FIELD

The invention relates generally to a telephone call processing system and a method of processing telephone calls, and in particular to systems and methods that facilitate secure transmission of sensitive information by voice during a call between a caller and an agent such that the agent does not receive the sensitive information.

BACKGROUND

Call centres are typically large facilities of telephone operators or 'agents'. These centers are provided by organizations that want to interact with existing or prospective clients and customers. A call center agent normally interacts with a client or customer by taking or making telephone calls.

One use of call centers is to provide services to the public that allow payment for goods and services via telephone calls. Each year, millions of people make purchases through agents in telephone call centers, often including high value transactions. For example, family holidays and financial products are often purchased over the telephone. In these transactions, the caller is required by the agent to provide certain pieces of sensitive information in order to confirm his or her identity and/or to complete the purchase. In particular, one or more bank account numbers, and debit or credit card details including the primary account number (PAN), start date, expiry date, and the card security code (e.g. CV2).

It is an unfortunate fact of life that wherever people have access to sensitive information, it will be misused. Data and card fraud perpetrated by call center agents, as well as fraudulent financial transactions are well-documented problems that need to be addressed. By divulging identity and/or financial information to an agent for processing a transaction through a call center, a caller puts themselves at risk of having that information stolen by the agent and used for nefarious purposes.

Some solutions that prevent the agent from accessing the caller's sensitive information involve handing the call over to an IVR platform and letting the customer enter their PAN and CVC by DTMF (Dual Tone Multi Frequency) 'touch tones' using their telephone keypad. Other solutions allow the customer to enter their details while still in conversation with the agent using DTMF but achieving security by blocking the tones from reaching the agent and any call recording equipment. Both these schemes fall down when the caller does not have a touch tone phone or, for some reason such as disability, is unable to enter the data when requested. Such systems are described, for example, in U.S. Pat. No. 8,750,471.

Alternative approaches using ASR (Automatic Speech Recognition) software have been used but the accuracy of these systems is not always sufficient to achieve reliable operation particularly when the caller has a regional accent or there is background noise present on the call. Whilst the grammar is very small in the case of an ASR application designed to capture card numbers (essentially digits 0-9, plus variations such as 'double', 'zero' and 'oh') and the accuracy achieved when recognizing a single digit may typically be of the order of 98%, the problem becomes greatly exacerbated when trying to capture a whole card number (typically 16 digits) and CVV (typically 3 digits). The result is only useable to carry out a transaction if all 19 digits are captured correctly. With each digit recognition being independent of those preceding (which is a close approximation to the case here) and an individual digit recognition accuracy of 98% the overall expected accuracy will be 0.98$^{19}$ which is approximately 0.68 or 68%. This is clearly an unacceptable level of performance. Even the fact that the first digit of the PAN can normally be constrained to be one of 3, 4 or 5 and that the last digit of the PAN, which is a Luhn check digit, can be calculated from the previous 15 does little to improve the situation, improving the expected accuracy only by around 3%. This has led to the necessity of inserting clumsy verification steps into the interaction whereby the system reads back the number that it has recognized and asks the caller to confirm.

The present invention provides a solution that allows spoken digits of a caller's card number and CVV to be accurately and quickly recognized without compromising the security of the caller's information.

SUMMARY

The present invention relates to a method for securely identifying alphanumeric characters from a voice stream containing a sequence of spoken alphanumeric characters. The method comprises receiving the voice stream, identifying, by a processor, utterances within the voice stream and generating a sequence of utterances from the identified utterances, each utterance corresponding to one or more of the spoken alphanumeric characters. One or more of the identified utterances is output to one or more recognition agents, and subsequently, identified alphanumeric characters corresponding to the utterances output to the one or more recognition agents are received from the recognition agents. A sequence of identified alphanumeric characters is then compiled from the received identified alphanumeric characters such that the position of each identified alphanumeric character in the sequence of identified alphanumeric characters is the same as the position of the corresponding spoken alphanumeric character in the sequence of spoken alphanumeric characters.

In a first embodiment of the invention, all of the utterances are output to one recognition agent.

At least a portion of the sequence of utterances may be scrambled according to a scrambling key and it is the scrambled sequence of utterances that is output to the recognition agent. The received identified alphanumeric characters are de-scrambled according to the scrambling key to generate the sequence of identified alphanumeric characters. By scrambling the sequence of utterances before it is output to the recognition agent, the recognition does not have access to the original string of alphanumeric characters and cannot easily reconstruct the original spoken string of alphanumeric characters.

In a second embodiment of the invention, the identified utterances are output to two or more recognition agents.

The sequence of identified utterances may be partitioned into two or more subsets utterances, and each subset of utterances is transmitted to a different one of the two or more recognition agents. The sequence of utterances may be partitioned according to a partition key and the received identified alphanumeric characters are compiled according to the partition key to generate the sequence of identified alphanumeric characters.

The sequence of identified utterances may be scrambled according to a scrambling key before the sequence is partitioned, and the received identified alphanumeric characters may be compiled according to the partition key and the scrambling key to generate the sequence of identified alphanumeric characters.

Alternatively, each subset of utterances may be scrambled according to a scrambling key and the received identified alphanumeric characters may be compiled according to the partition key and the scrambling key to generate the sequence of identified alphanumeric character.

The identified utterances may be partitioned into exclusive subsets of the utterances, i.e. each utterance appears in one and only of the subsets, and each exclusive subsets of utterances is output to a different one of the two or more recognition agents.

In a third embodiment, the method further comprises attempting to identify alphanumeric characters in the sequence of utterances before the utterance are output to one or more recognition agents.

The utterances that could not be successfully identified are output to the one or more recognition agents, and the sequence of identified alphanumeric characters is compiled from the identified alphanumeric characters received from the one or more recognition agents and the alphanumeric characters that were successfully identified without being transmitted to the recognition agents.

Attempting to identify the alphanumeric characters may be carried out by an automatic speech recognition system. An attempt to identify an alphanumeric character may be considered to be successful if the identification confidence is above a threshold value, and is unsuccessful if the identification confidence is below the threshold value.

The method may further comprise attempting to carry out a transaction using the alphanumeric characters in the sequence of identified alphanumeric characters, and if the attempt to carry out a transaction fails outputting the utterances that were deemed successfully identified to the one or more remote agents for verification. Verified alphanumeric characters corresponding to the utterances output to the one or more recognition agents for verification are received from the recognition agent and the sequence of identified alphanumeric characters is re-compiled by replacing the alphanumeric characters deemed identified with the verified alphanumeric characters received from the one or more recognition agents.

In each of the embodiments, the one or more recognition agents may include at least one human agent, and the method may further comprise generating and outputting an audible reproduction of each output utterance for use by a human recognition agent.

The one or more recognition agents may alternatively or additionally include at least one automatic speech recognition system, and the method may further comprise transmitting the utterances to the at least one automatic speech recognition system.

An energy threshold detection algorithm may be applied to the voice stream to identify each utterance. Each utterance may be stored in a separate buffer. Alternatively, timing information of the boundaries between the identified utterances in the voice stream may be stored. Of course, it will be appreciated that any suitable type of storage may be used to store the utterances or boundary locations.

The present invention also includes a call processing system comprising a processor configured to perform the steps of the method, a computer program product comprising instructions which, when the program is executed by a computer, cause the computer to carry out the steps of the method and a computer-readable medium comprising instructions which, when executed by a computer, cause the computer to carry out the steps of the method.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present invention solves the problem of allowing spoken digits of a caller's card number and CVV to be accurately and quickly recognized without compromising the security of the caller's information by providing incomplete or scrambled alphanumeric characters spoken by the caller to one or more recognition agents, e.g. human agents, to be reliably identified. Of course, it will be appreciated that the present invention can be applied to the protection of any sensitive information that comprises a sequence of alphanumeric characters, for example social security numbers or bank account details, and is not limited to credit/debit card information.

Figure 1:
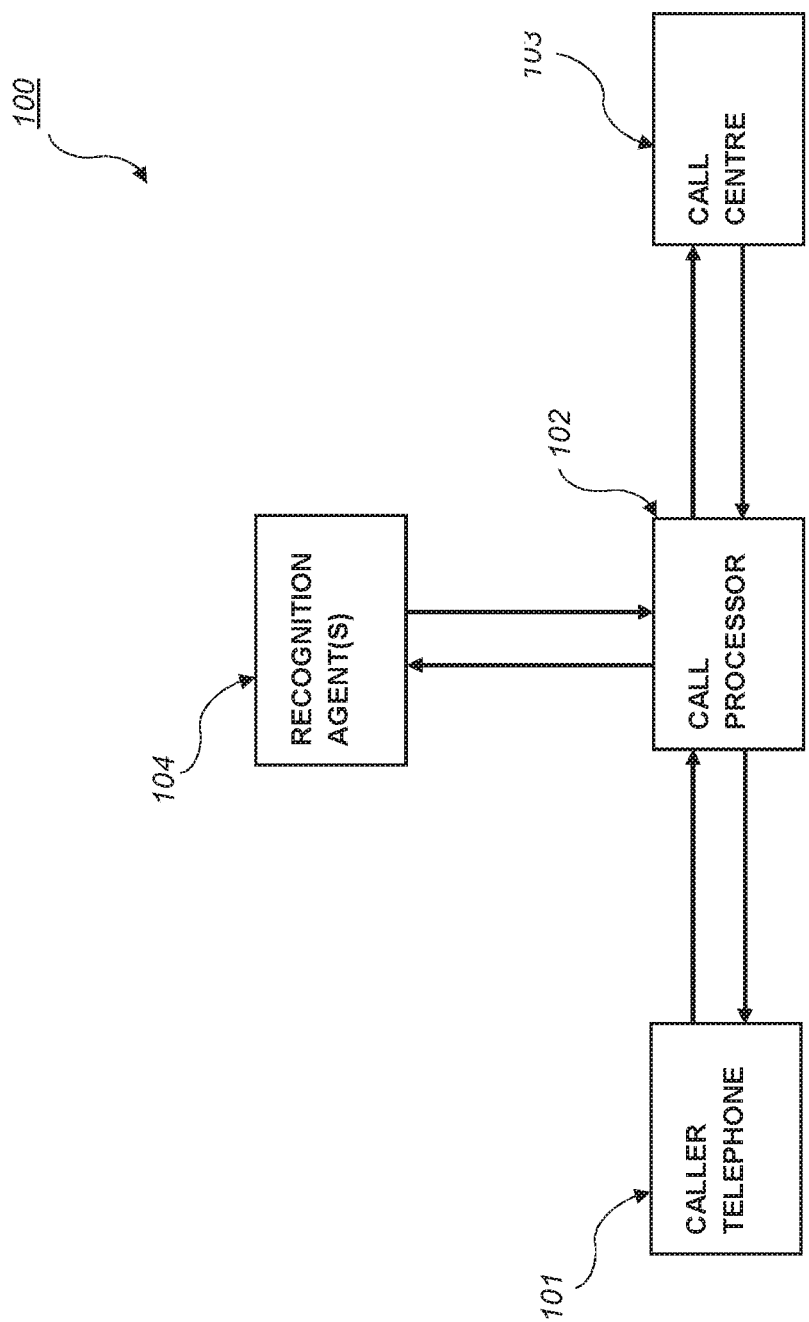
FIG. 1 depicts a system architecture according to the present invention.

FIG. 1 depicts a system 100 according to the present invention. The system 100 includes a caller telephone 101, which may be a traditional landline (POTS) telephone, mobile telephone, VoIP telephone or any other such device. The caller telephone 101 is in communication with a call center 103 via a call processor 102. The communication network between the caller telephone 101 and call center 103 may be facilitated, for example, by the public-switched telephone network (PSTN), IP-based networks or otherwise. The call processor 102 is located on the voice path between the caller telephone 101 and call center 103, and may be co-located with the call center 103, or may be remote from the call center 103. The call processor 102 may optionally also be in communication with one or more dedicated recognition agents 104. The recognition agents 104 may be located remotely from the call center and/or remotely from the call processor 102, and may be connected to the call processor 102 by any suitable network. As will be appreciated from the discussions below, the role of the recognition agent 104 may also be carried out, at least in part, by an agent or call center representative at the call center 103.

Figure 2:
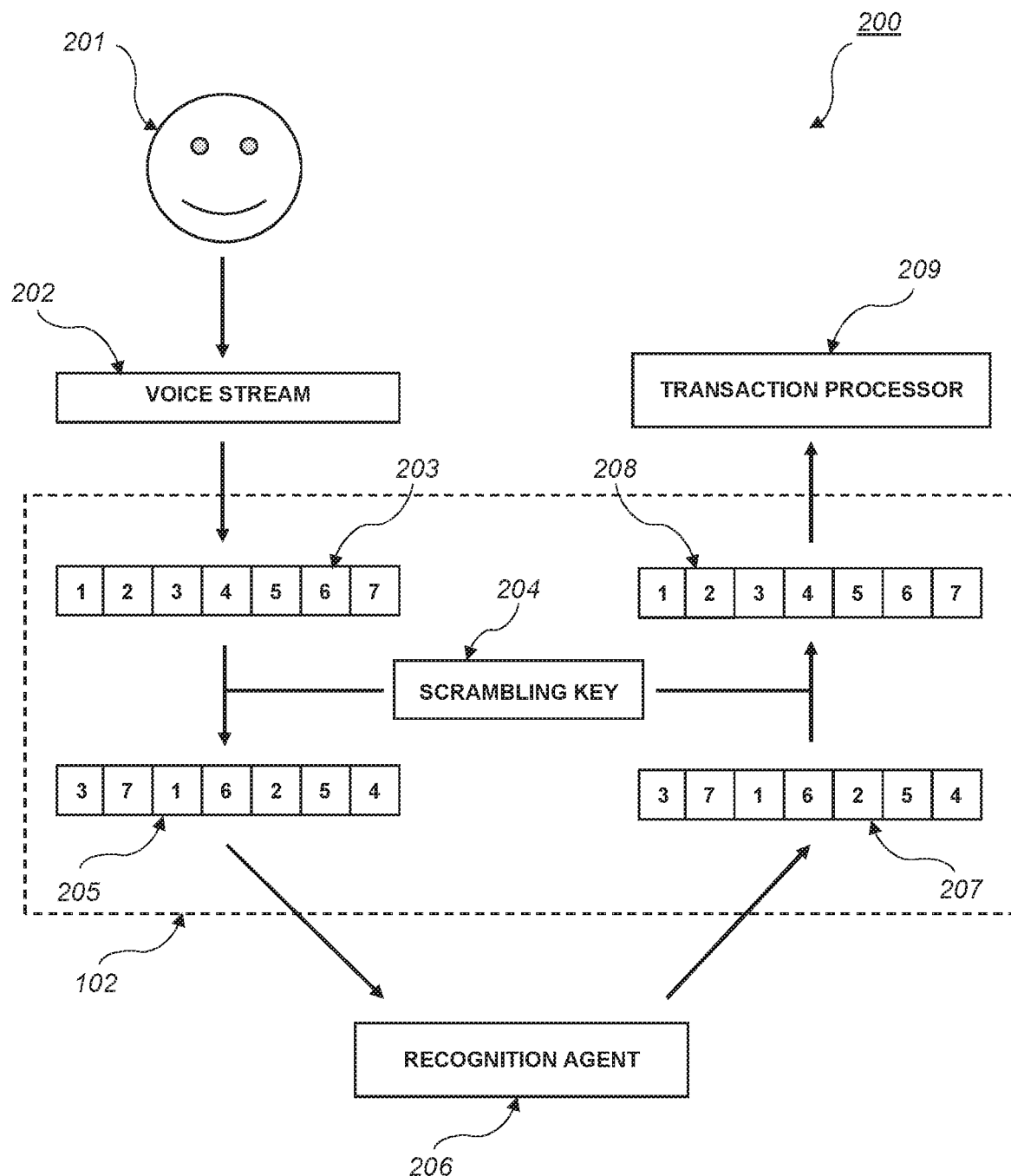
FIG. 2 depicts a process for securely identifying alphanumeric characters from a voice stream according to a first embodiment of the invention.

FIG. 2 depicts a process 200 for identifying alphanumeric characters from a voice stream according to a first embodiment of the invention. A caller 201 speaks the alphanumeric characters that are to be identified into a telephone, i.e. caller telephone 101, producing a voice stream 202 that is transmitted via a telephone network (and/or any other intermediate networks) to the call processor 102 (represented by the dashed box in FIG. 2). It will of course be appreciated that it is not an essential part of the process that a user contemporaneously speaks the alphanumeric characters into a telephone; all that is required for the process to operate is a voice stream containing spoken forms of alphanumeric characters to be received by the call processor 102.

Typically, when a CSR is ready to take card details from a caller he or she sends a signal to a call processor 102, which blocks the audio towards the agent and writes the voice stream 202 into a buffer. The audio may then be un-blocked once the caller has finished speaking the card details, and the voice stream 202 is passed on to the agent 103 by the call processor 102 without interference.

As each digit in the voice stream is received, the call processor 102 identifies utterances within the voice stream 202 by determining the boundaries in the voice stream 202 between each spoken alphanumeric character, e.g. using an energy threshold detection algorithm, as described for example in An Algorithm For Determining The Endpoints Of Isolated Utterances, L. R. Rabiner and M. R. Sambur, The Bell System Technical Journal (Volume: 54, Issue: 2, February 1975). The call processor 102 may then store the identified utterances 203 in separate buffers or may store the boundary locations between each utterance in the voice stream 202 along with the voice stream 202 itself. In the context of the present invention, the term "utterance" is a single distinguishable spoken unit in the voice stream 202, typically relating to an individual spoken alphanumeric character, but may correspond to two or more spoken alphanumeric characters, for example when the two or more spoken alphanumeric characters cannot be distinguished.

Once a predetermined number of utterances 203 has been identified, the call processor 102 scrambles, i.e. re-orders, at least some, preferably all of the utterances according to a scrambling key 204, which is stored at the call processor 102. The scrambling key 204 may be re-used for multiple voice streams received by the call processor 102, but for improved security, a new scrambling key 204 is generated for each session. Any known algorithm for scrambling, i.e. re-ordering, the sequence of utterances may be used by the call processor 102, e.g. the Knuth shuffle.

After the sequence of identified utterances 203 has been scrambled, the scrambled sequence of utterances 205 is output to a recognition agent 206 from the call processor 102. The recognition agent identifies the alphanumeric character spoken in each utterance, and returns a sequence of identified alphanumeric characters 207 to the call processor 102.

It will be appreciated that the scrambled sequence of utterances 205 may be output to the recognition agent 206 in any suitable manner, e.g. in an audio stream over a telephone line, or as an audio stream or audio files over an IP-based network. The recognition agent 206 may receive the scrambled utterances sequentially, and return the identified alphanumeric characters sequentially. Furthermore, since the agent or CSR currently handling is essentially idle while the audio on the call it blocked, it is possible for the agent or CSR to act as the recognition agent 206. The recognition agent may alternatively be a dedicated recognition agent at a different location. In some embodiments, the recognition agent may be an ASR system. By providing a scrambled sequence of utterances, the ASR system can be kept out of the scope of security standards such as PCI-DSS.

The scrambling key 204 can be used to un-scramble the scrambled sequence of identified alphanumeric characters 207 because the position of each identified alphanumeric character in the scrambled sequence of identified alphanumeric characters 207 is the same as the position of the corresponding utterance in the scrambled sequence of utterances 205. Once unscrambled, the sequence of identified alphanumeric characters 208 can then be transmitted to a transaction processor 209, or some other device, to enable the desired transaction to be carried out.

By scrambling the identified utterances 203 before they are output to the recognition agent 206, the alphanumeric characters represented by each individual utterance can still be identified by the recognition agent 206 while the correct order of the identified utterances 203 (i.e. the correct order of the alphanumeric characters) cannot be identified by the recognition agent. This can be demonstrated by considering the probability of correctly guessing the PAN and CVV from the scrambled string of digits known to the recognition agent.

In the context of card payments, each sequence of identified utterances can be assumed to be 19 digits long—most PANs are 16 digits long and most CVVs are 3 digits long. A notable exception is that of American Express cards which have 15 digit PANs and 4 digit CVVs but the combined total is still 19. Of these 19 digits, the first digit is normally one or 3, 4 or 5, and the 16th digit is a Luhn check digit, which can be calculated from the preceding 15. By ignoring these two digits, the effective length of the combined PAN and CVV is 17 digits.

Since the 17 digits must belong to the set of digits 0-9, at least seven digits will be repeated somewhere in the sequence. If the seven repeated digits are distinct, then considering the digits as a multiset of size 17, there are 7 elements with a multiplicity of two and 10 elements with a multiplicity of 1. The number of permutations of a multiset of k items with multiplicities $m_1, m_2, \ldots, m_n$ is $k!/m_1!m_2! \ldots m_n!$. If the 7 repeated digits are each distinct, then the number of permutations of numbers that could be derived from these digits is $17!/2!^7 \, 1!^3$, which is approximately $10^{12}$ possible PAN/CVV combinations. Even in the worst-case scenario where a single digit is repeated seven times, the number of permutations of these digits is $17!/7! \, 1!^9$ or approximately $10^{11}$ possible PAN/CVV combinations.

To put these numbers into context, they can be compared with the current practice in the prior art. It is common practice on EPOS terminal receipts to mask only the CVV and middle six digits from the PAN giving 9 unknown digits. Because the Luhn check digit is not masked, it is possible to effectively calculate one of the middle six digits given a guess at the other 5. This effectively reduces the number of unknown digits to 8, which gives 108 possible PAN/CVV combinations—about 2000 times easier to guess than the worst-case scenario when scrambling the digits.

Figure 3:
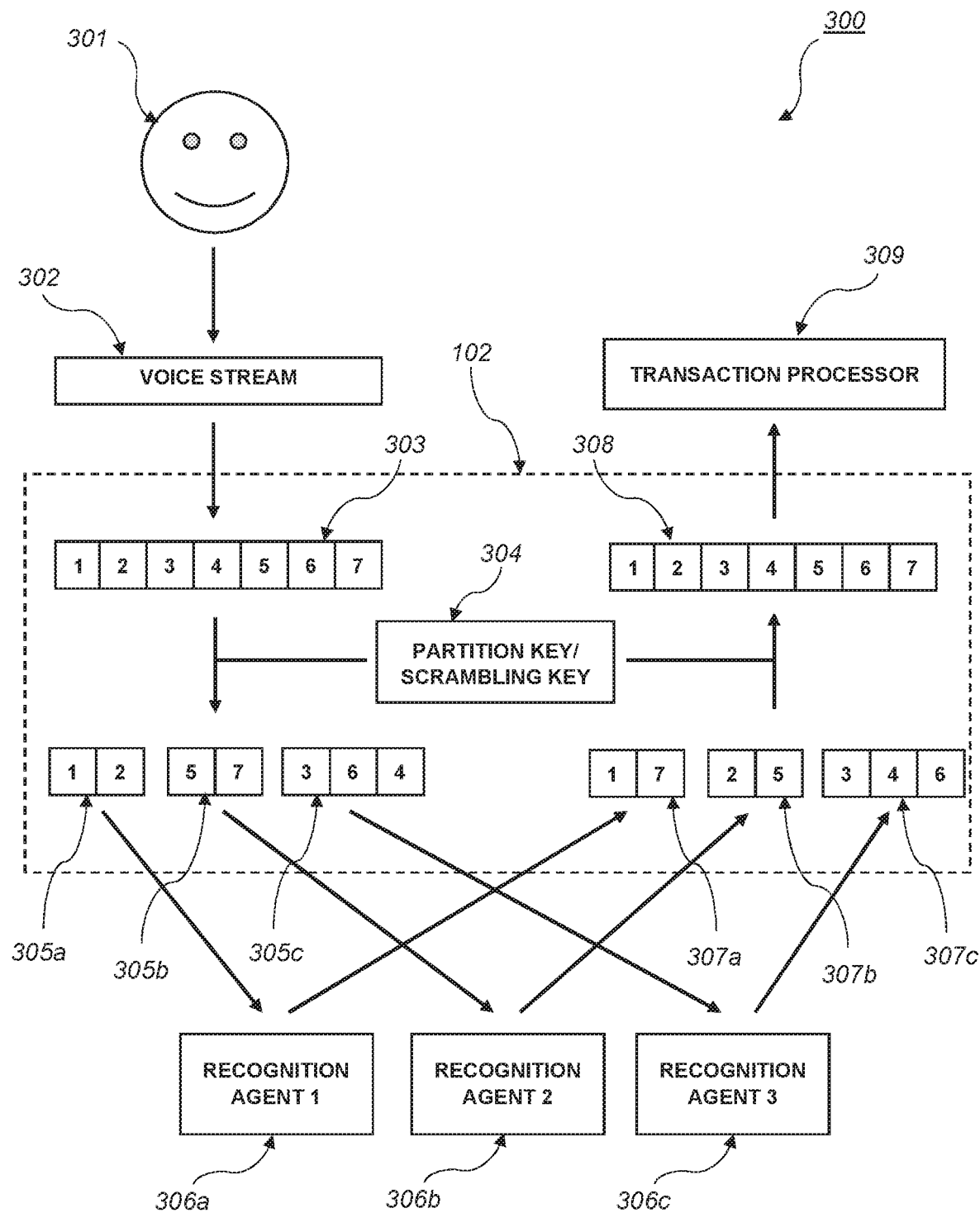
FIG. 3 depicts a process for securely identifying alphanumeric characters from a voice stream according to a second embodiment of the invention.

FIG. 3 depicts a process 300 for identifying alphanumeric characters from a voice stream according to a second embodiment of the invention.

As in the first embodiment depicted in FIG. 2, a caller 301 speaks the alphanumeric characters that are to be identified into a telephone, i.e. caller telephone 101, producing a voice stream 302 that is transmitted via a telephone network (and/or any other intermediate networks) to the call processor 102 (represented by the dashed box in FIG. 3). Again, all that is required for the process to operate is a voice stream containing spoken forms of alphanumeric characters to be received by the call processor 102.

As above, when a CSR is ready to take card details from a caller he or she sends a signal to a call processor 102, which blocks the audio towards the agent and writes the voice stream 302 into a buffer. The audio may then be un-blocked once the caller has finished speaking the card details, and the voice stream 302 is passed on to the agent 103 by the call processor 102 without interference.

As each digit in the voice stream is received, the call processor 102 identifies utterances within the voice stream 302 by determining the boundaries in the voice stream 302 between each spoken alphanumeric character, e.g. using an energy threshold detection algorithm. The call processor 102 may then store the identified utterances 303 in a separate buffers or may store the boundary locations between each utterance in the voice stream 302 along with the voice stream 302 itself.

The sequence of identified utterances 303 is then partitioned (i.e. split) into three sub-sets 305a, 305b and 305c according to a partition key 304, which is stored by the call processor 102 for later use. Each sub-set 305a, 305b 305c is then output to a different recognition agent 306a, 306b, 306c. In this manner, no single recognition agent has enough of the individual spoken alphanumeric characters to identify the whole spoken string of alphanumeric characters. For increased security, each recognition agent 306a, 306b, 306c may be physically located remotely from the other recognition agents to prevent communication and collusion between recognition agents, although the system provides improved security so long as the recognition agents cannot identify which sub-sets 305a, 305b, 305c they each receive relate to one another.

In addition to partitioning the sequence identified utterances into the sub-sets 305a, 305b and 305c, the division of the identified utterances into the sub-sets may be further convoluted or scrambled according to one of the following scenarios:

(i) each sub-set 305a, 305b, 305c may themselves be made up of non-consecutive sequence items, e.g. sub-set 305b, or (ii) the sequence of identified utterances 303 may be scrambled before it is partitioned into sub-sets 305a, 305b, 305c, or (iii) each sub-set 305a, 305b, 305c may be made up of non-consecutive sequence items that are individually scrambled, or (iv) each sub-set 305a, 305b, 305c may be made up of consecutive sequence items that are individually scrambled, e.g. sub-set 305c.

In these situations, the additional information describing how the sequence of utterances 303 has been partitioned and scrambled to produce the sub-sets 305a, 305b, 305c may also be stored by the call processor 102 as part of the partition key 304, i.e. the partition key 304 includes a scrambling key, as an additional separate scrambling key or otherwise. By including this additional layer of scrambling, even if multiple malicious recognition agents are able to identify which sub-sets are part of the same overall sequence, it is still extremely difficult to re-assemble the original sequence of identified utterances. Preferably, scenario (i) or (ii) is employed, since these techniques result in the greatest number of possible original sequences of identified utterances and provide the greatest impediment to unauthorized reconstruction of the original sequence.

It will be appreciated that while the exemplary sequence of utterances 303 depicted in FIG. 3 has been partitioned into three sub-sets 305a-c that are output to three recognition agents 306a-c, any number of sub-sets and recognition agents greater than one can be used. Indeed, the higher the number of sub-sets and recognition agents, the more secure the system is. Preferably, the two or more sub-sets into which the utterances are partitioned are exclusive in the sense that each utterance in the sequence of utterances in included in one and only one sub-set. By partitioning the sequence of identified utterances into exclusive sub-sets, each recognition agent receives the minimum amount of potentially sensitive information. However, it will be appreciated that partitioning the sequence of identified utterances into exclusive sub-sets is not necessary for the method to successfully and securely identify the spoken alphanumeric characters.

After the subsets 305a, 305b, 305c are output to the recognition agents 306a, 306b, 306c, the recognition agents 306a, 306c, 306c identify the alphanumeric character spoken in each utterance, and return subsets of identified alphanumeric characters 307a, 307b, 307c to the call processor 102.

Again, the sub-sets of utterances 305a, 305b, 305c may be output to the recognition agents 306a, 306b, 306c in any suitable manner, e.g. in an audio stream over a telephone line, or as an audio stream or audio files over an IP-based network. The recognition agents 306a, 306b, 306c may receive the scrambled utterances sequentially, and return the identified alphanumeric characters sequentially. Furthermore, since the agent or CSR currently handling is essentially idle while the audio on the call it blocked, it is possible for the agent or CSR to act as one of the recognition agents 306a, 306b or 306c.

The partition key 304 (and the scrambling key, if necessary) can be used to re-assemble (and un-scramble, if necessary) the sub-sets of identified alphanumeric characters 307a, 307b and 307c such that the position of each identified alphanumeric character in the sequence of identified alphanumeric characters 308 is the same as the position of the corresponding spoken alphanumeric character in the sequence of alphanumeric character in the voice stream 302. Once re-assembled, the sequence of identified alphanumeric characters 308 can then be transmitted to a transaction processor 309, or some other device, to enable the desired transaction to be carried out.

Figure 4:
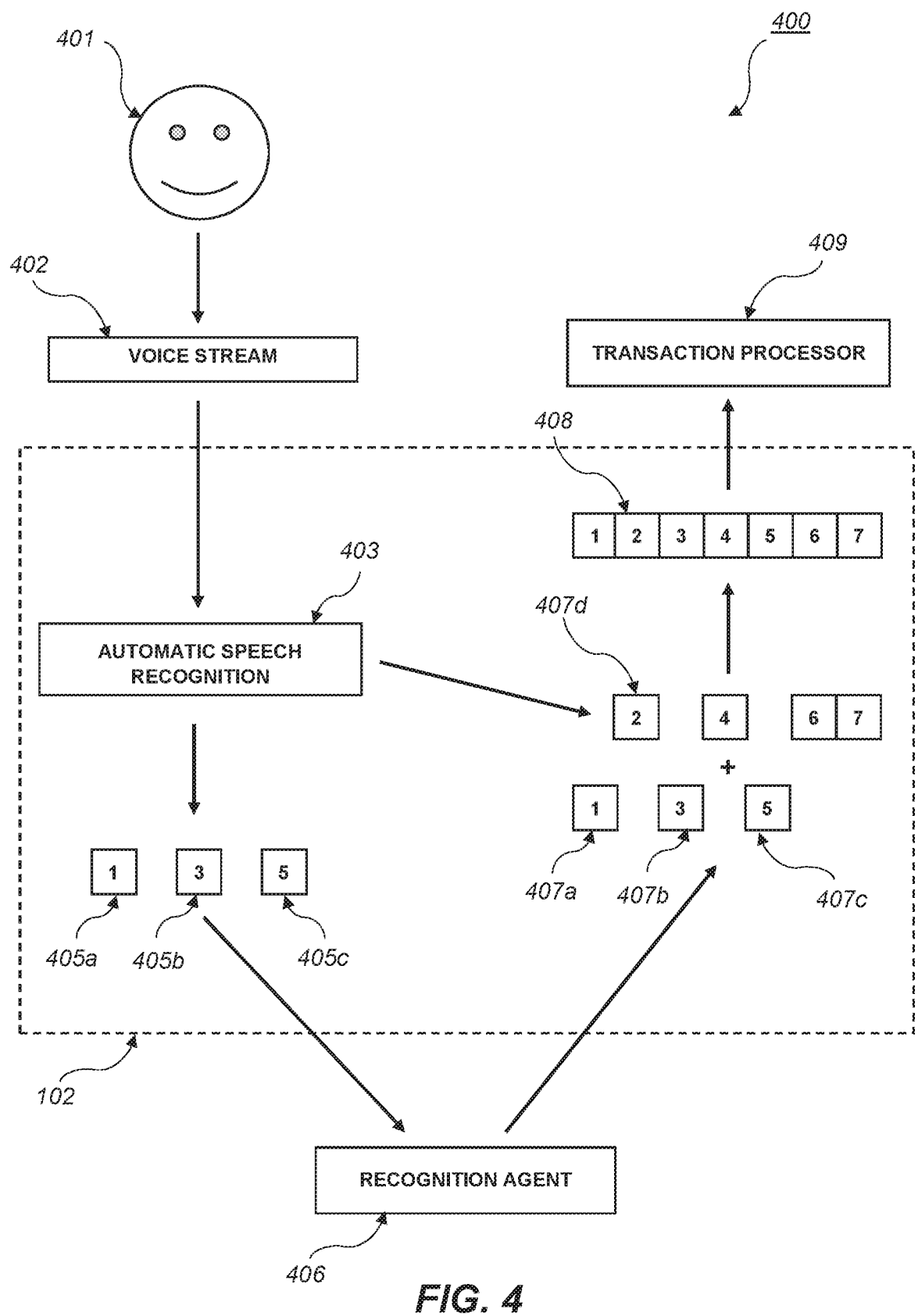
FIG. 4 depicts a process for securely identifying alphanumeric characters from a voice stream according to a third embodiment of the invention.

FIG. 4 depicts a process 400 for identifying alphanumeric characters from a voice stream according to a third embodiment of the invention.

As for the processes depicted in FIGS. 2 and 3, a caller 301 speaks the alphanumeric characters that are to be identified into a telephone, i.e. caller telephone 101, producing a voice stream 402 that is transmitted via a telephone network (and/or any other intermediate networks) to the call processor 102 (represented by the dashed box in FIG. 4). Again, all that is required for the process to operate is a voice stream containing spoken forms of alphanumeric characters to be received by the call processor 102.

As above, when a CSR is ready to take card details from a caller he or she sends a signal to a call processor 102, which blocks the audio towards the agent and writes the voice stream 402 into a buffer. The audio may then be un-blocked once the caller has finished speaking the card details, and the voice stream 302 is passed on to the agent 103 by the call processor 102 without interference.

The call processor 102 uses an automatic speech recognition (ASR) system 403 to attempt to identify at least, and preferably all of the spoken alphanumeric characters in the voice stream 402. When the ASR system is able to successfully identify an alphanumeric character in the spoken sequence of alphanumeric characters, the identified character and its position in the spoken sequence of alphanumeric characters is output to a partial sequence of identified alphanumeric characters 407*d*. When the ASR system 403 cannot successfully identify one of the spoken alphanumeric characters, the utterance 405*a*, 405*b* or 405*c* corresponding to the spoken alphanumeric character is output to a recognition agent 406. The recognition agent returns an identified alphanumeric character 407*a*, 407*b* or 407*c*.

An alphanumeric character may be considered to be successfully identified if the ASR system 403 has a confidence rating above a threshold value, e.g. above 90%, 95%, or 97%, and unsuccessful if the confidence rating is below the threshold value.

Once all of the spoken alphanumeric characters have been identified, the call processor 102 assembles the identified alphanumeric characters 407*a*, 407*b*, 407*c* and the partial sequence of identified alphanumeric characters 407*d* to generate the sequence of identified alphanumeric characters 408, such that the position of each identified alphanumeric character in the sequence of identified alphanumeric characters 408 is the same as the position of the corresponding spoken alphanumeric character in the sequence of alphanumeric character in the voice stream 402.

In order to assemble the sequence of identified alphanumeric characters 408 from the individual identified characters 407*a*, 407*b*, 407*c* and the partial sequence 407*d*, the call processor 102 must know the positions of each identified character. For the partial sequence 407*d*, the call processor can simply store the identified characters along with their position in the sequence; however, it is undesirable to transmit the position of the utterance in the sequence to the agent along with the utterance itself, as this would make it easier for a malicious agent to piece back together any sensitive information if a large number of utterances cannot be successfully recognized by the ASR system 403. Thus, in order to avoid transmitting the sequence position with the utterance, the call processor may transmit a token with the utterance, where the token has no extrinsic meaning. When the identified alphanumeric character is returned to the call processor, along with the token, the call processor 102 can look up the sequence number associated with the token in order to place the identified alphanumeric 407*a*, 407*b* or 407*c* in the correct position in the sequence.

It will be appreciated that the utterances 405*a*, 405*b* and 405*c* that cannot be identified by the ASR system 403 do not need to be transmitted to the same recognition agent, nor do they need to be transmitted separately. For example, each utterance 405*a*, 405*b*, 405*c* may be transmitted to a different recognition agent, as set out in the description of FIG. 3 above. Similarly, the utterances 405*a*, 405*b*, 405*c* may be placed in a scrambled sequence and transmitted together to a single recognition agent, as described above with respect to FIG. 2.

Given that some, or all, of the identified alphanumeric characters 408 are identified by the ASR system, which may be more likely to make mistakes than a human recognition agent, when a transaction is attempted using the identified alphanumeric characters, the transaction may fail. If the transaction fails, the transaction processor 409 may signal the call processor 102 to indicate that the transaction has failed due to, for example, an unrecognized PAN or CVV, and the call processor 102 may initiate an alternative process for identifying the spoken alphanumeric characters in the voice stream, such as the process described with respect to FIG. 2 or FIG. 3.

It will be appreciated that throughout all of the described embodiments, the recognition agents 104, 206, 306, 406 may be the most accurate when the recognition agent is a human agent. However, it is also possible for the recognition agent 104 to be an ASR system. While this may reduce the accuracy of the system, the improved security benefits of the system are still present. Furthermore, since the recognition agents 104 are separate to the call processor 102, any kind of recognition agent may be replaced with more accurate ASR systems developed in the future.

The principles of the present invention can also be applied to biometric speaker verification. Biometric speaker verification systems work by comparing voice prints calculated from the spectral characteristics of the received speech stream with stored voice prints of users that have been authenticated by other means.

The systems fall into two categories: text-dependent and text-independent. In text-independent systems the spoken text in enrolment and verification can differ, making the system much more flexible for commercial use as there is effectively no need for the speaker's cooperation in either the enrolment or verification process.

Because of the computationally intensive nature of the process, these systems lend themselves to being delivered as a service charged on a per use basis. However, it is often the case that elements of the conversation used for verification may contain personal information (e.g. name, address or account number) which should remain confidential.

In order to protect this confidential information, the speech stream may be broken on word boundaries and different portions sent to a number of different servers, for spectral feature extraction. These spectral features may then be re-combined and further processed to produce a voice print which is then used for matching. In this way, the information reaching any one server has been severely devalued to a hacker that may intercept it.

ADDITIONAL CONSIDERATIONS

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for secure data exchange by voice in telephone calls through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for securely identifying alphanumeric characters from a voice stream containing a sequence of spoken alphanumeric characters, the method comprising:
    (i) receiving the voice stream;
    (ii) identifying, by a processor, utterances within the voice stream and generating a sequence of utterances from the identified utterances, each utterance corresponding to one or more of the spoken alphanumeric characters;
    (iii) outputting one or more of the identified utterances to one or more recognition agents;
    (iv) receiving, from the recognition agents, identified alphanumeric characters corresponding to the utterances output to the one or more recognition agents; and
    (v) compiling a sequence of identified alphanumeric characters from the received identified alphanumeric characters such that the position of each identified alphanumeric character in the sequence of identified alphanumeric characters is the same as the position of the corresponding spoken alphanumeric character in the sequence of spoken alphanumeric characters.

2. The method of claim 1 wherein, at step (iii), all of the utterances are output to one recognition agent.

3. The method of claim 2 wherein:
    at step (iii), at least a portion of the sequence of utterances is scrambled according to a scrambling key and the scrambled sequence of utterances is output to the recognition agent; and
    at step (v), the received identified alphanumeric characters are de-scrambled according to the scrambling key to generate the sequence of identified alphanumeric characters.

4. The method of claim 1 wherein, at step (iii), all of the identified utterances are output to two or more recognition agents.

5. The method of claim 4 wherein, at step (iii), the sequence of identified utterances is partitioned into two or more subsets utterances, and each subset of utterances is transmitted to a different one of the two or more recognition agents.

6. The method of claim 5 wherein the sequence of utterances is partitioned according to a partition key and wherein, at step (v), the received identified alphanumeric characters are compiled according to the partition key to generate the sequence of identified alphanumeric characters.

7. The method of claim 6, wherein the sequence of identified utterances is scrambled according to a scrambling key before the sequence is partitioned, and at step (v), the received identified alphanumeric characters are compiled according to the partition key and the scrambling key to generate the sequence of identified alphanumeric character.

8. The method of claim 6, wherein each subset of utterances is scrambled according to a scrambling key and at step (v), the received identified alphanumeric characters are compiled according to the partition key and the scrambling key to generate the sequence of identified alphanumeric character.

9. The method of claim 4, wherein the identified utterances are partitioned into exclusive subsets of the utterances, and wherein each exclusive subsets of utterances is output to a different one of the two or more recognition agents.

10. The method of claim 1 wherein step (ii) further comprises attempting to identify alphanumeric characters in the sequence of utterances.

11. The method of claim 10 wherein:
    the one or more utterances that are output in step (iii) are utterances that could not be successfully identified at step (ii); and at step (v), the sequence of identified alphanumeric characters is compiled from the identified alphanumeric characters received from the one or more recognition agents and the alphanumeric characters that were successfully identified at step (ii).

12. The method of claim 11, wherein attempting to identify the alphanumeric characters is carried out by an automatic speech recognition system.

13. The method of claim 12, wherein an attempt to identify an alphanumeric character is successful if the identification confidence is above a threshold value, and is unsuccessful if the identification confidence is below the threshold value.

14. The method of claim 13, further comprising the steps:
(vi) attempting to carry out a transaction using the alphanumeric characters in the sequence of identified alphanumeric characters, and if the attempt to carry out a transaction fails:
(vi)(a) outputting the utterances that were successfully identified at step (ii) to the one or more remote agents for verification;
(vi)(b) receiving, from the recognition agents, verified alphanumeric characters corresponding to the utterances output to the one or more recognition agents at step (vii); and
(vi)(c) re-compiling the sequence of identified alphanumeric characters by replacing the alphanumeric characters identified at step (ii) with the verified alphanumeric characters received from the one or more recognition agents.

15. The method of claim 1, wherein the one or more recognition agents includes at least one human agent, and step (iii) further comprises generating and outputting an audible reproduction of each output utterance for use by the at least one recognition agent.

16. The method of claim 1, wherein the one or more recognition agents includes at least one automatic speech recognition system, and step (iii) further comprises transmitting the utterances to the at least one automatic speech recognition system.

17. The method of claim 1, wherein step (ii) comprises identifying applying an energy threshold detection algorithm to the voice stream to identify each utterance.

18. The method of claim 1, wherein step (ii) further comprises storing each utterance in a separate buffer, or storing timing information of the boundaries between the identified utterances in the voice stream.

19. A call processing system comprising a processor configured to perform a method for securely identifying alphanumeric characters from a voice stream containing a sequence of spoken alphanumeric characters, the method comprising:
(i) receiving the voice stream;
(ii) identifying, by a processor, utterances within the voice stream and generating a sequence of utterances from the identified utterances, each utterance corresponding to one or more of the spoken alphanumeric characters;
(iii) outputting one or more of the identified utterances to one or more recognition agents;
(iv) receiving, from the recognition agents, identified alphanumeric characters corresponding to the utterances output to the one or more recognition agents; and
(v) compiling a sequence of identified alphanumeric characters from the received identified alphanumeric characters such that the position of each identified alphanumeric character in the sequence of identified alphanumeric characters is the same as the position of the corresponding spoken alphanumeric character in the sequence of spoken alphanumeric characters.

20. A non-transitory computer-readable medium comprising instructions which, when executed by a computer, cause the computer to carry out a method for securely identifying alphanumeric characters from a voice stream containing a sequence of spoken alphanumeric characters, the method comprising:
(i) receiving the voice stream;
(ii) identifying, by a processor, utterances within the voice stream and generating a sequence of utterances from the identified utterances, each utterance corresponding to one or more of the spoken alphanumeric characters;
(iii) outputting one or more of the identified utterances to one or more recognition agents;
(iv) receiving, from the recognition agents, identified alphanumeric characters corresponding to the utterances output to the one or more recognition agents; and
(v) compiling a sequence of identified alphanumeric characters from the received identified alphanumeric characters such that the position of each identified alphanumeric character in the sequence of identified alphanumeric characters is the same as the position of the corresponding spoken alphanumeric character in the sequence of spoken alphanumeric characters.

* * * * *